US012693128B1

(12) United States Patent

Maciolek et al.

(10) Patent No.: US 12,693,128 B1

(45) Date of Patent: Jul. 28, 2026

(54) SYSTEMS AND METHODS FOR AUTOMATIC ROUTING AND AUTONOMOUS DRIVING USING DRIVING SKILL EVALUATIONS

(71) Applicant: UIPCO, LLC, San Antonio, TX (US)

(72) Inventors: Michael J. Maciolek, Kerrville, TX (US); Donnette L. Moncrief Brown, San Antonio, TX (US); Manfred Amann, San Antonio, TX (US); Snehal Desai, Richardson, TX (US); Nicole Ferretti, Plano, TX (US); Melissa Jane Porter, Lutz, FL (US); Sayeef Rahim, Frisco, TX (US); Andrew Logan Taylor, San Antonio, TX (US); Martin Lopez, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 83 days.

(21) Appl. No.: 18/756,514

(22) Filed: Jun. 27, 2024

Related U.S. Application Data

(60) Provisional application No. 63/511,120, filed on Jun. 29, 2023.

(51) Int. Cl.

| | |
|---|---|
| *G01C 21/34* | (2006.01) |
| *B60W 40/09* | (2012.01) |
| *B60W 60/00* | (2020.01) |

(52) U.S. Cl.
CPC ......... *G01C 21/3484* (2013.01); *B60W 40/09* (2013.01); *B60W 60/0015* (2020.02)

(58) Field of Classification Search
CPC .......... G01C 21/3484; B60W 60/0015; B60W 40/09
See application file for complete search history.

(56) References Cited

U.S. PATENT DOCUMENTS

2021/0188311 A1\* 6/2021 Cho ...................... H04W 72/23
2023/0294670 A1\* 9/2023 Oesterling ............ B60W 30/08
                                                             701/1
2024/0067216 A1\* 2/2024 Gokhale ........... B60W 50/0097

FOREIGN PATENT DOCUMENTS

JP          6513069 B2 * 5/2019 ............ B60W 40/08
WO    WO-2023233625 A1 * 12/2023 ............... G08G 1/16

* cited by examiner

*Primary Examiner* — Scott A Browne
*Assistant Examiner* — Terry C Buse
(74) *Attorney, Agent, or Firm* — Plumsea Law Group, LLC

(57) ABSTRACT

Systems and methods for evaluating driving performance for a given driver/user of a motor vehicle, and automatically modifying the operation of one or more vehicle systems based on the evaluated driving performance. Driving performance may be inferred from input from one or more sensors. The sensor input may be fed to a machine learning classifier, which predicts a corresponding "driving skill level," such as "Beginner," "Intermediate," or "Advanced." Using the predicted driving skill level, the performance of vehicle systems may be modified to improve safety and/or driver experience.

20 Claims, 8 Drawing Sheets

602

ROUTE
PARAMETERS

105

ROUTE
DIFFICULTY
EVALUATOR

604

ROUTE DIFFICULTY
LEVEL / MINIMUM
DRIVING SKILL LEVEL

SYSTEMS AND METHODS FOR AUTOMATIC ROUTING AND AUTONOMOUS DRIVING USING DRIVING SKILL EVALUATIONS

CROSS-REFERENCE TO RELATED APPLICATIONS

This application claims the benefit of Provisional Patent Application No. 63/511,120 filed Jun. 29, 2023, and titled "Systems and Methods for Automatic Routing and Autonomous Driving Skill Evaluations," which is incorporated by reference herein in its entirety.

TECHNICAL FIELD

The present disclosure generally relates to vehicles, and in particular, to systems and methods for operating vehicle systems according to driver behaviors.

BACKGROUND

Driving safety for motor vehicles is important due to their widespread use. Depending on a driver's skill level, different driving activities may be considered relatively safe or relatively risky. However, in most situations neither the operation of the vehicle nor the driving conditions are altered to accommodate differences in driving skill.

There is a need in the art for a system and method that addresses the shortcomings discussed above.

SUMMARY

In some aspects, the techniques described herein relate to a motor vehicle, including: a plurality of sensors; a vehicle system; and a driving skill system, wherein the driving skill system is further configured to: receive information from the plurality of sensors while a user is driving the motor vehicle; provide the information from the plurality of sensors to a machine learning classifier to determine a driving skill level for the user; and modify the operation of a vehicle system using at least the driving skill level.

In some aspects, the techniques described herein relate to a method of routing a motor vehicle, including: monitoring information from one or more sensors while a user drives a motor vehicle; providing the monitored information from the one or more sensors to a machine learning classifier and outputting, with the machine learning classifier, a driving skill level for the user and storing the driving skill level for the user in memory; receiving, at a navigation system, a destination from the user; retrieving, from memory, the driving skill level for the user; determining a first route from a current location to the destination and a determining a second route from the current location to the destination; evaluating a first route difficulty for the first route and a second route difficulty for the second route; and automatically determining that the first route is more suitable for the driving skill level based on the first route difficulty and based on the second route difficulty.

In some aspects, the techniques described herein relate to a method of modifying vehicle systems in a motor vehicle, including: monitoring information from one or more sensors while a user drives a motor vehicle; providing the monitored information from the one or more sensors to a machine learning classifier and outputting, with the machine learning classifier, a driving skill level for the user and storing the driving skill level for the user in memory; detecting a driving condition; and modifying the operation of a vehicle system of the motor vehicle based on the driving condition and the driving skill level stored in memory.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide systems and methods for evaluating driving performance for a given driver/user of a motor vehicle, and automatically modifying the operation of one or more vehicle systems based on the evaluated driving performance. In some embodiments, driving performance is inferred from input from one or more sensors. The sensor input is fed to a machine learning classifier, which predicts a corresponding "driving skill level," such as "Beginner," "Intermediate," or "Advanced." Using the predicted driving skill level, the performance of vehicle systems may be modified to improve safety and/or driver experience. For example, possible routes determined by a navigation system can be evaluated according to a "route difficulty" metric and compared to the driving skill level of the driver. Only routes with an appropriate route difficulty may be recommended to the driver. As another example, a system could detect driving conditions (such as nighttime driving) that may be difficult for drivers with less than a threshold driving skill level and automatically modify the operation of one or more vehicle control systems (such as the ability to turn the car on or setting a maximum allowed driving speed) accordingly.

Figure 1:
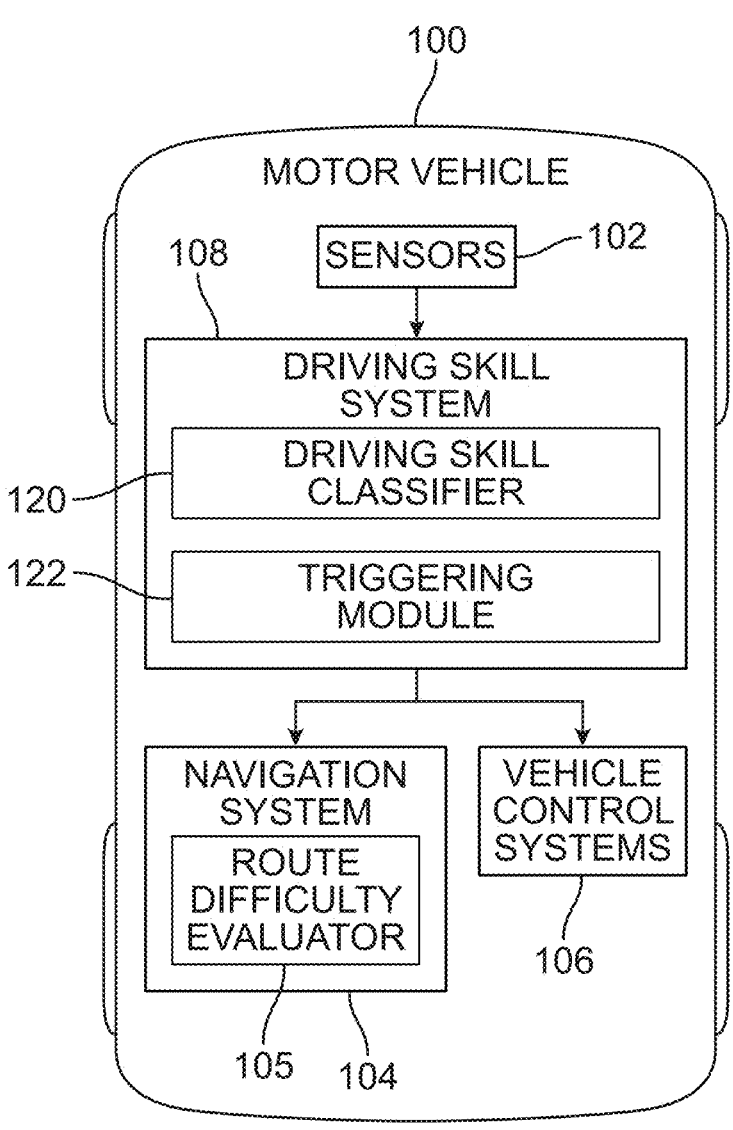
FIG. 1 is a schematic view of a motor vehicle, according to an embodiment.

FIG. 1 is a schematic view of a motor vehicle 100, according to an embodiment. As used herein, the term "motor vehicle" may refer to various kinds of vehicles having either engines (that is, gas powered vehicles) or electric motors (that is, electrically powered vehicles). Exemplary vehicles include, but are not limited to, cars, trucks, motorcycles, electric scooters, and other suitable vehicles. In some embodiments, vehicles could include planes, helicopters, drones, and other aerial vehicles, as well as boats.

Motor vehicle 100 may include a plurality of sensors 102, which collect information about the state of a vehicle (such as the speed and current steering angle) and/or about the state of the environment (such as the time of day and weather conditions). These sensors may include, but are not limited to, gyroscopes, velocity sensors (such as wheel speed sensors), acceleration sensors (including accelerator pedal sensors), steering angle sensors, throttle opening sensors, gear state sensors, brake system sensors (including brake pedal sensors), Light Detection and Ranging ("LIDAR") sensors, Radar sensors and optical sensors (cameras).

Motor vehicle 100 may also include one or more vehicle systems. These vehicle systems could include a navigation system 104 as well as various vehicle control systems 106. In some embodiments, navigation system 104 includes a route difficulty evaluator 105. Route difficulty evaluator 105 may comprise one or more algorithms to evaluate the difficulty of various navigation routes as it pertains to driving skills such as comfort with merging, high traffic routes, and other driving skills.

Figure 2:
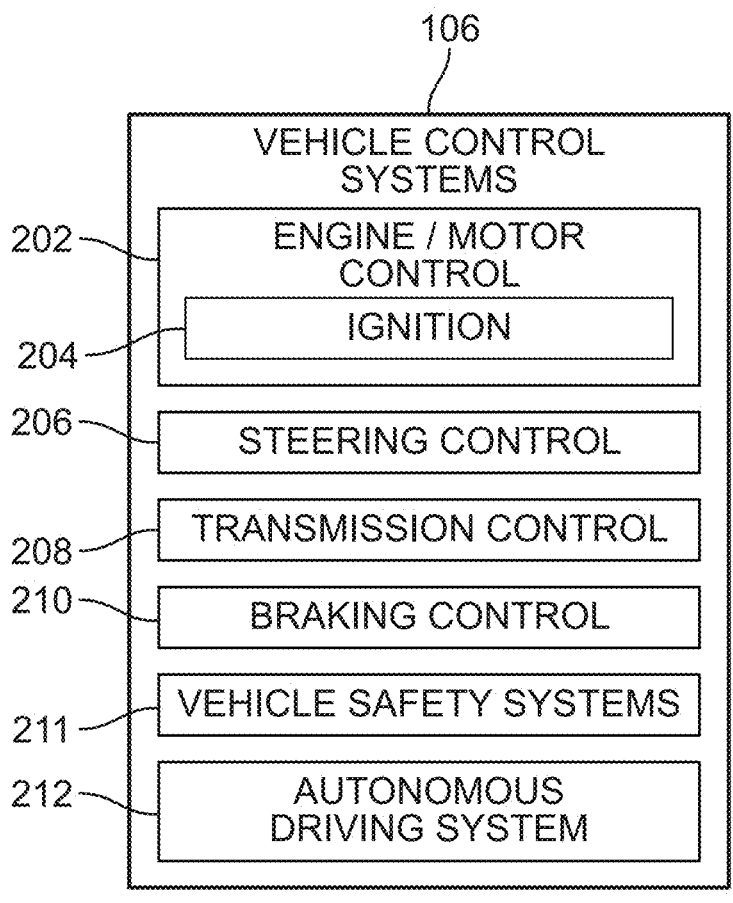
FIG. 2 is a schematic view of various vehicle control systems, according to an embodiment.

As shown in FIG. 2, vehicle control systems 106 may include, but are not limited to systems for engine/motor control 202, ignition 204, steering control 206, transmission control 208, and braking control 210. Vehicle control systems 106 could also include one or more vehicle safety systems 211, such as anti-lock braking systems, lane departure warning systems, blind spot detection systems, and automatic emergency braking systems. Vehicle control systems 106 could also include an autonomous driving system 212, which may provide autonomous driving capabilities for motor vehicle 100. In particular, autonomous driving system 212 may be capable of monitoring information from sensors 102 (such as video from a camera and information from a LIDAR device) and autonomously controlling motor vehicle 100 to drive to a given location.

Referring back to FIG. 1, motor vehicle 100 may also include a driving skill system 108. Driving skill system 108 (or simply "system 108") may include provisions for monitoring driver behavior, determining a driver's skill level, and/or modifying the operation of one or more vehicle systems, as described in further detail below. System 108 may include driving skill classifier 120 ("classifier 120"). Classifier 120 may comprise a machine learning classifier that maps input information (such as sensor information) to one or more driving skill classes, as discussed below and shown in FIG. 3.

System 108 may also include a triggering module 122. Using triggering module 122, system 108 can analyze information from one or more sensors 102 to identify various driving behaviors, patterns, and/or triggering actions for other modules. Triggering module 122 may be configured to communicate with one or more vehicle systems, including navigation system 104 and/or one or more of vehicle control systems 106. For example, triggering module 122 may provide instructions and/or requests to modify the activity of navigation system 104 and/or to modify the activity of one or more of vehicle control systems 106, as discussed below.

It may be appreciated that each of the components, systems, and modules shown in the Figures and described herein may be implemented (run) on one or more onboard units (OBUs). Each OBU comprises a computing system with one or more processors as well as a non-transitory computer readable medium (memory) that stores instructions to be executed by the one or more processors. Moreover, each of the components, systems, and/or the motor vehicle itself could include suitable communication components, such as wireless networking components.

In other embodiments, not all components may be integrated into a motor vehicle. For example, a driving skill system may be implemented on a separate computing system, which may be in communication with one or more components of a motor vehicle. Likewise, a navigation system may be implemented on a separate computing system, which may be in communication with one or more components of a motor vehicle. In another exemplary embodiment, a driver may use a mobile phone with mobile software applications that implement one or both of a driving skill system and/or a navigation system.

Moreover, while plurality of sensors 102 are shown as residing on/within motor vehicle 100, in other embodiments sensory input could also be received from external sensors. For example, velocity, acceleration, and other kinds of motion data could be obtained from sensors within a driver's phone. As another example, images of a vehicle moving along a street or through some other space could be captured using external cameras (for example, red light cameras, parking garage cameras, or other suitable external cameras). Additionally, non-sensory information, such as a time of day, traffic information, or other suitable information could be received from various external sources.

Figure 3:
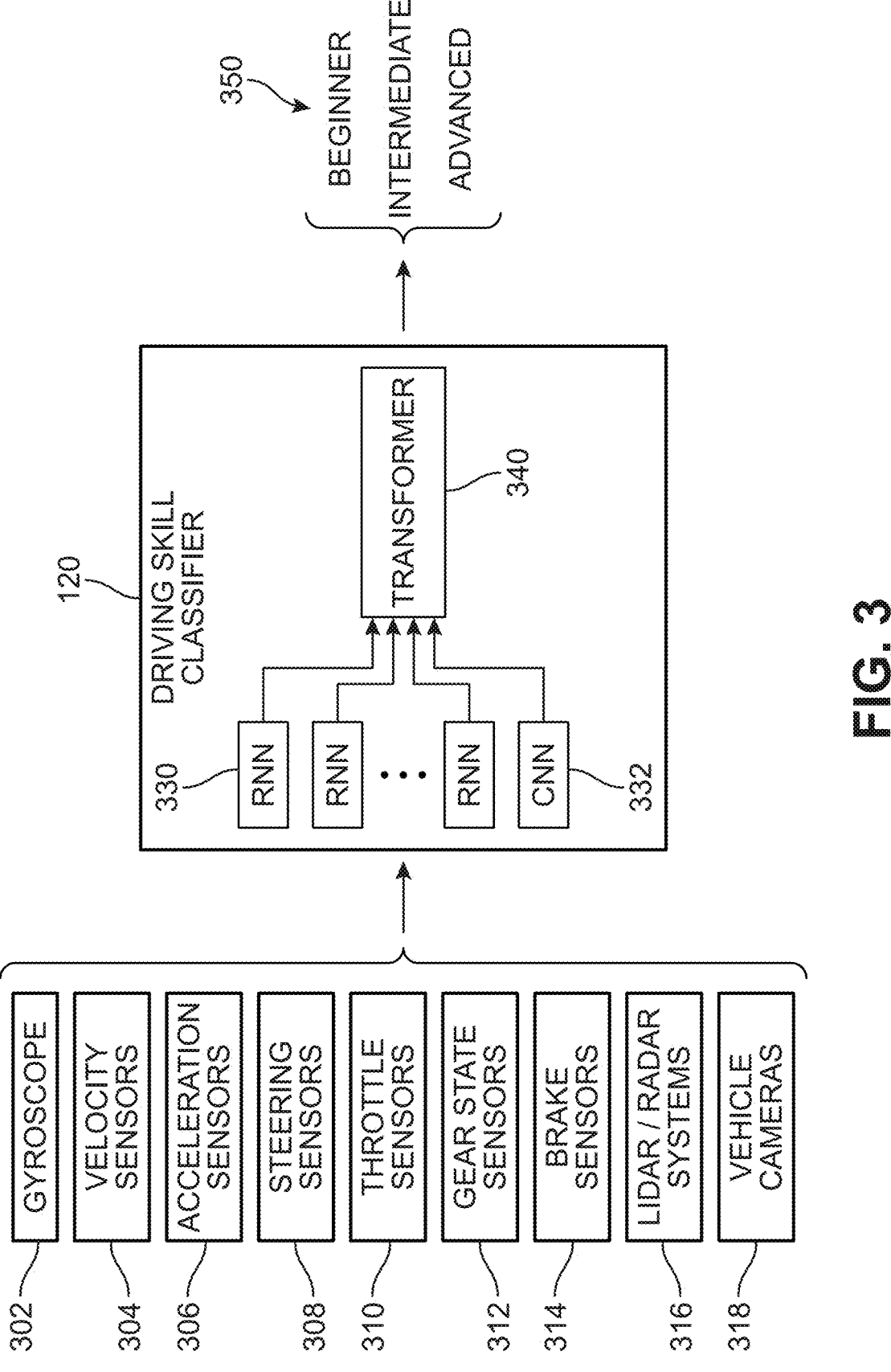
FIG. 3 is a schematic view of a driving skill classifier and its associated inputs and outputs, according to an embodiment.

FIG. 3 is a schematic view of driving skill classifier 120 and its associated inputs and outputs. Classifier 120 could comprise one or more machine learning algorithms, models, or systems that may be trained with data and that are able to classify inputs associated with driving behaviors according to the driver's skill level.

As used herein, the term "driving skill level" refers to a measure of the driver's (or user's) skill in driving an associated motor vehicle. In some embodiments, driving skill level may refer to an overall measurement or indicator of the driver's general ability to drive in a variety of different scenarios. In other embodiments, driving skill level could be specific to particular driving activities or tasks, such as merging, driving in high traffic areas, parallel parking, or other specific activities and tasks. That is, while the exemplary embodiment includes determining an overall driving score for each driver/user, other embodiments may include determining a separate driving skill level for different driving activities/tasks. For example, a driving skill classifier may assign a first driving skill level to a user for merging and a second driving skill level to the same user for parallel parking.

Classifier 120 may receive various inputs. These can include inputs or information from one or more of plurality of sensors 102, as well as from other sources. As shown in FIG. 3, exemplary inputs may comprise information from a gyroscope 302, velocity sensors 304, acceleration sensors 306, steering sensors 308, throttle sensors 310, gear state sensors 312, brake sensors 314, LIDAR and/or RADAR sensors 316, as well as from one or more vehicle cameras 318.

These inputs are provided to, and processed by, classifier 120, which may comprise any suitable machine learning architecture. Exemplary classifiers could include decision trees, random forests, support vector machines, clustering algorithms (such as K-Nearest Neighbors), and neural networks.

Because sensed vehicle data may be provided as time-series data (such as velocity over time or brake pedal position over time), suitable machine learning classifiers may include Transformer-based neural networks and/or recurrent neural networks (RNNs). For clarity, an exemplary machine learning architecture is shown for driving skill classifier 120 in FIG. 3, though it may be appreciated that the embodiments are not limited to this particular architecture. In the exemplary architecture, time series data from one or more sensors is fed into a corresponding RNN (such as RNN 330), with the outputs of the set of RNNs being fed into one or more transformers (such as transformer 340). The transformer may then predict an overall driving skill level based on the outputs of the various corresponding RNNs, which themselves are tuned to predict relevant features for corresponding time series data. In some cases where image data is available from cameras or RADAR/LIDAR systems, the image data could be processed using one or more convolutional neural networks (CNNs), such as CNN 332.

Because the inputs may change rapidly, resulting in continuous variations in the predicted output of the whole system, including changes in the discrete predictions of driving skill levels, the architecture could optionally include a machine learning module that averages out the outputs of the transformer over longer intervals of time to ensure that the driving predictions remain relatively stable over a period during which the driver's performance may be monitored. This could be done using, for example, another transformer or RNN in the final stages of the architecture (not shown) which may be trained to change very slowly over the relevant periods of time.

Classifier 120 may output a driving skill level, comprising a discrete category or class from a set of possible outputs 350. For example, the driving skill level may be one of three possible classes: "Beginner," "Moderate," or "Advanced." Still other embodiments may use additional classifications, including additional classes between "Beginner" and "Moderate" as well as between "Moderate" and "Advanced."

In other embodiments, classifier 120 could output a continuous variable, such as a number between 1 and 10. In such an embodiment, higher numbers could indicate better driving skill, while lower numbers indicate relatively lower driving skill.

The embodiments may include provisions for automatically modifying one or more vehicle systems to accommodate different driving skill levels. This may facilitate safer driving, especially for users/drivers with relatively low driving skills (such as young or beginning drivers).

Figure 4:
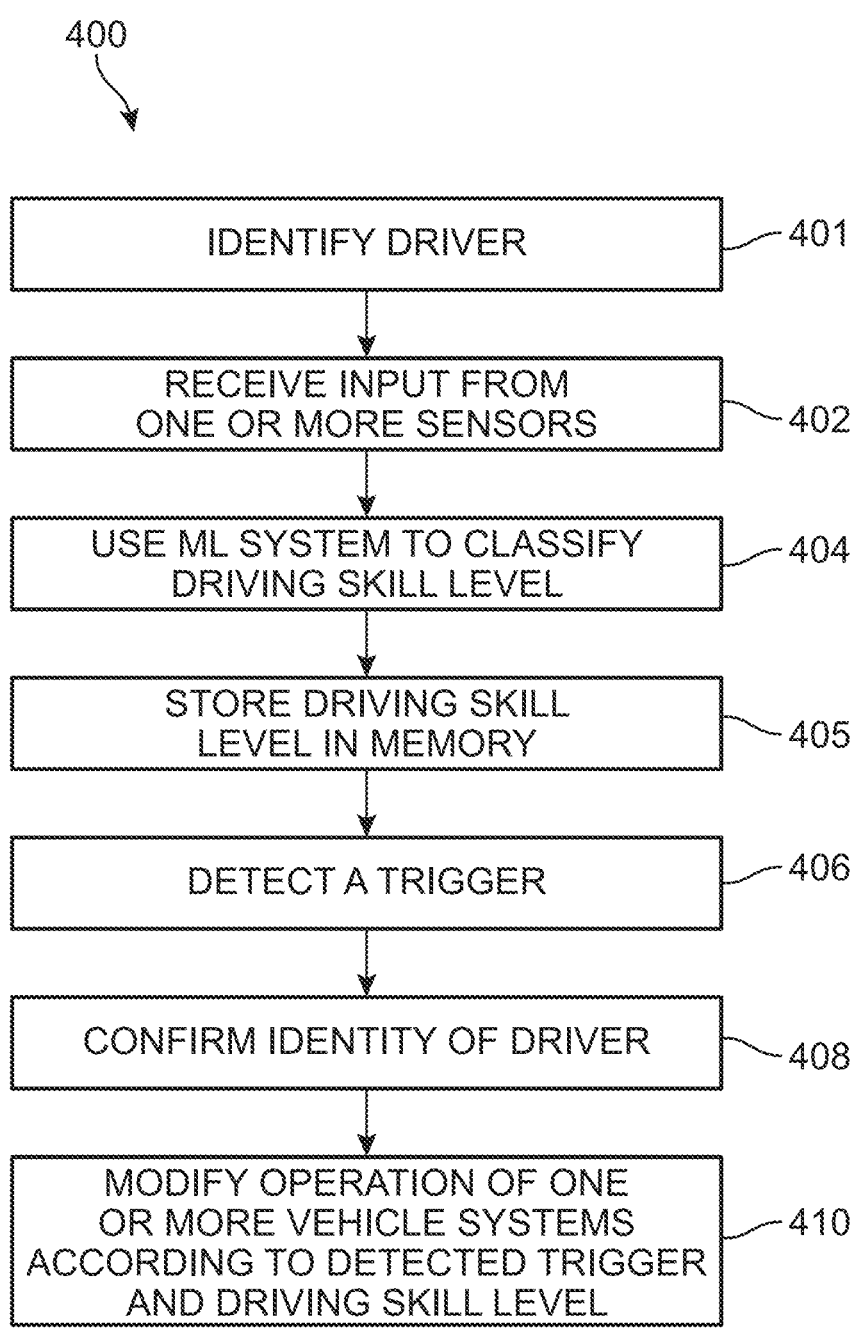
FIG. 4 is a schematic process for modifying the operation of one or more vehicle systems according to detected driving conditions and a driver's current skill level, according to an embodiment.

FIG. 4 is a schematic process 400 for modifying the operation of one or more vehicle systems based on detected driving conditions and a driver's current skill level, according to an embodiment. One or more of the following steps may be accomplished by a driving skill system (such as driving skill system 108, or simply system 108). In some cases, one or more of the following steps may be performed by a vehicle system.

Prior to evaluating a driver's skill level, system 108 may check to determine the identity of the driver present in the motor vehicle, as in step 401. The driver identity could be determined using a variety of different methods and associated systems/components. In some cases, where each driver has a unique key fob, for example, the vehicle could identify the particular driver from information associated to the key fob. In other cases, the vehicle could detect the presence of the driver's cell phone or other personal electronic device. In still other cases, the system could audibly query the user for their name/identity using a suitable digital personal assistant integrated into the vehicle and/or into the driver's phone (which may communicate with components of the vehicle). This allows the system to identify a unique user and store a corresponding driving skill level for each different driver of a vehicle.

In step 402, system 108 may receive input (any data and/or information) from one or more sensors. These could include onboard vehicle sensors, sensors on a driver's phone, or information from external sensors (such as red-light cameras, etc.). Next, in step 404, system 108 may use a driving skill classifier, such as classifier 120, to predict a driver's skill based on the present driving behavior (via data from sensors). In step 405, the driving skill level determined in step 404 can be stored in memory. In particular, the driving skill level may be associated to a particular driver/user in memory. In some cases, where multiple driving skill levels are determined for different driving tasks, each of the different driving skill levels associated to a user could be stored in memory.

In step 406, system 108 may detect a trigger. Exemplary triggers could be inputs to a navigation system, as described below and shown in FIGS. 5-7, as well detecting known driving conditions that may affect driving behaviors. For example, in some cases the time of day could provide a trigger, since it may generally be more difficult to drive at night (and therefore a driver with a low driving skill level may require additional assistance at night).

In step 408, prior to modifying the operation of any vehicle systems, system 108 could confirm the identity of the current driver. This may be necessary as the process of determining a driver's skill level may occur at regular intervals in time (for example, every week or month) and there may be intermediate times when other drivers are using the vehicle. To ensure the system retrieves the appropriate driving skill level for the current driver, system 108 may confirm or re-identify the driver using any suitable method including those described above for step 401.

In step 410, system 108 may modify the operation of one or more vehicle systems according to both the detected trigger from step 408 and the driving skill level, which was previously stored in memory in step 405. Moreover, prior to, or during step 410, system 108 may retrieve the stored driving skill level for the current driver/user from memory.

The embodiments are not limited to a particular combination of triggers and associated vehicle systems. For purposes of clarification, several non-limiting examples are given. As a first example, a system could monitor time of day, weather conditions, and/or other conditions that may affect visibility and/or driving conditions (such as slick roads). If the system determines that a triggering condition exists (such as night time conditions or rainy conditions), the system could automatically modify the operation of one or more vehicle systems to prevent a user with a sufficiently low driving skill level from operating the vehicle. For example, if nighttime conditions are detected, and the driver is a teenager with a low driving skill level (such as a "Beginner" driving skill level), the system may automatically prevent the ignition from turning on. By contrast, another driver with an "intermediate" or "advanced" driving skill level may not be prevented from starting the vehicle in nighttime and/or rainy conditions.

As another example, if poor weather conditions are detected, and a driver has a sufficiently low driving skill level, the system could automatically engage otherwise optional driver assistance systems, such as lane departure assistance systems.

It may be appreciated that in some cases, the trigger may simply be turning on a vehicle. For example, in some embodiments upon detecting a startup event, the system could check the driving skill level of the current driver and determine if there are any modifications to be made based solely on the driving skill level. As an example, in some embodiments a maximum speed may be set for any driver with a beginner, or otherwise relatively low, driving skill level. That is, the system could send instructions to the engine control system and/or throttle system to prevent the vehicle from exceeding the predetermined maximum speed.

It may be appreciated that system 108 may store maps (for example, tables) that determine various modifications to one or more vehicle systems based on various triggering conditions and different driving skill levels. That is, the system checks for a particular triggering condition (including a simple ignition on event), as well as for a current driver skill level, and looks for any actions that should be taken given those two inputs. For example, whenever a beginner level driver is present the system may automatically engage certain vehicle safety systems. By contrast, for intermediate and/or advanced level drivers, the system may not automatically engage those same systems.

To further improve driving safety, embodiments can include provisions for selecting navigation routes that are best suited to a driver's driving skill level, rather than selecting routes only according to criteria such as route time or route distance.

Figure 5:
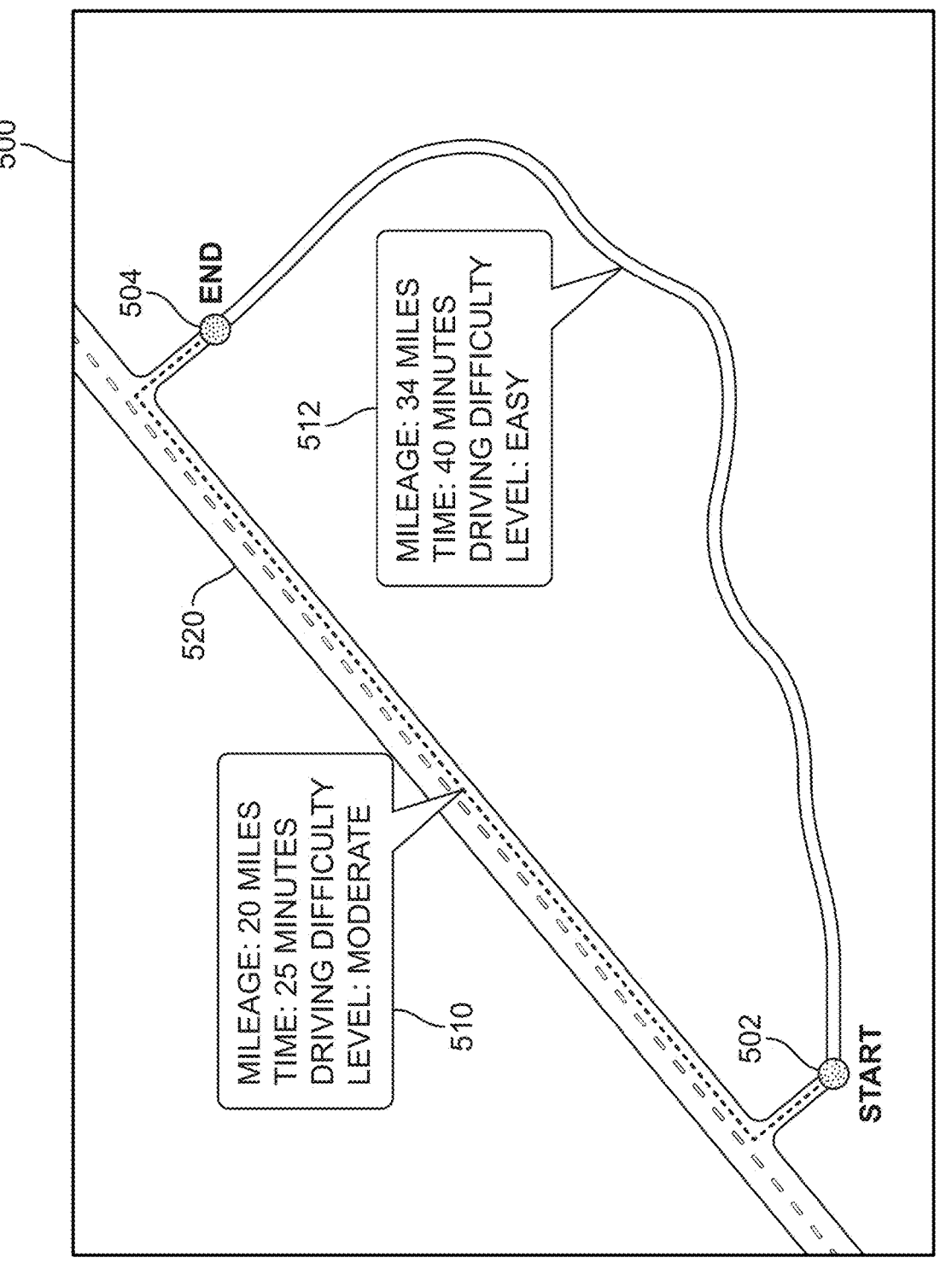
FIG. 5 is a schematic view of a navigation screen showing two possible routes for a driver that have been calculated by a navigation system, according to an embodiment.

FIG. 5 is a schematic view of a navigation screen 500 showing two possible routes for a driver that have been calculated by a navigation system (such as navigation system 104 in FIG. 1). In this example, the navigation system has determined that between a starting location 502 and an ending location 504, there are at least two possible routes. First route 510 is a more direct route, which minimizes driving time. However, first route 510 includes a long portion on a highway 520, which requires a driver to be comfortable with merging and higher speeds. By contrast, second route 512 is a less direct route, and takes significantly longer to traverse compared to first route 510. However, second route 512 does not require the driver to merge onto highway 520, and instead only requires driving on smaller roads with relatively low speed limits. For drivers with relatively high driving skill levels, the system may automatically choose first route 510, since driver's with higher driving skill levels shouldn't have a problem merging onto, and traveling along, highway 520. By contrast, for driver's with relatively lower driving skill levels, the system may automatically choose second route 512, thereby balancing the desire to get to the destination with the desire to limit driving scenarios that require significant experience/skill.

Figure 6:
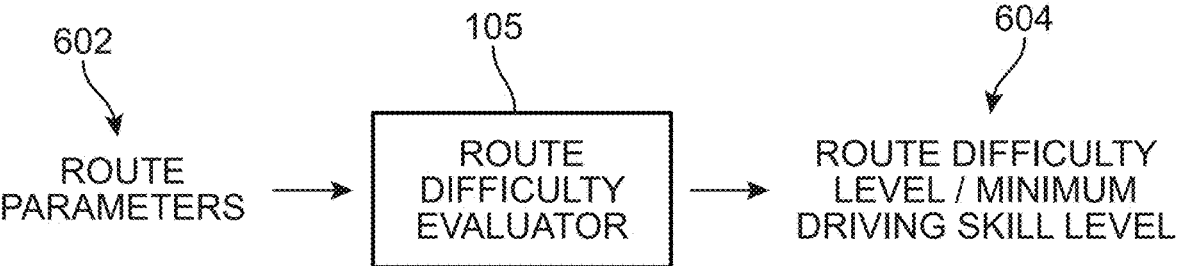
FIG. 6 is a schematic view of a route difficulty evaluator including inputs and outputs, according to an embodiment.

To determine a difficulty level for a particular route, navigation system 104 includes route difficulty evaluator 105. As shown in FIG. 6, route difficulty evaluator 105 may receive various route parameters 602 associated with the route, and outputs a route difficulty level 604. Alternatively, route difficulty evaluator 105 may output a minimum driving skill level needed to safely traverse the route.

Exemplary route parameters include, but are not limited to, speed limits along one or more sections of the route, whether or not merging is required, the need to make U-turns or navigate round-abouts or jug-handles, traffic levels, as well as other relevant route features that may be retrieved from a suitable GIS database or other data source associated with the navigation system.

To select an appropriate route, a navigation system may compare the route difficulty level or minimum driving skill required for the route with a driving skill level of the driver. The system may then select the fastest (or shortest) route that meets the necessary driving skill criteria/threshold.

Route difficulty evaluator 105 could comprise any suitable algorithm(s) for mapping route parameters to outputs. In some cases, route difficulty evaluator could use a scoring system so that different route parameters add or subtract to a final score which is then converted to a route difficulty level and/or minimum driving skill level. In other cases, route difficulty evaluator could comprise a machine learning algorithm that automatically learns, via labeled data, features that make routes more or less difficult. In some embodiments, a suitably trained neural network could be used to predict route level difficulty (or, alternatively, a minimum driving skill level).

Figure 7:
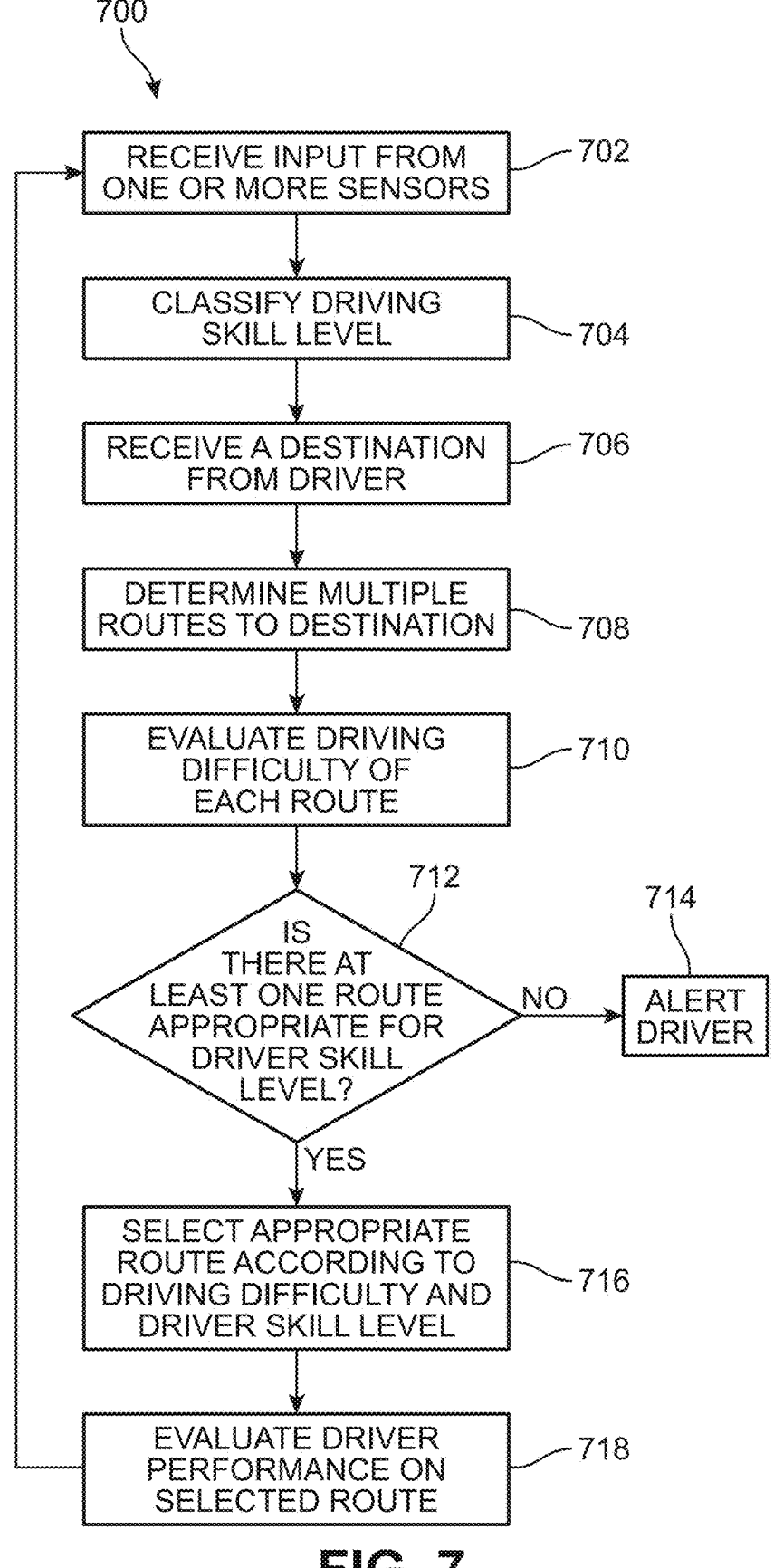
FIG. 7 is a schematic view of a process for automatically selecting navigation routes that are best suited to a driver's skill level, according to an embodiment.

FIG. 7 is a schematic view of a process 700 for automatically selecting navigation routes that are best suited to a driver's skill level. One or more of the following steps may be performed by a driving skill system, such as system 108. One or more steps may also be performed by another vehicle system, such as a navigation system.

Starting in step 702, system 108 may receive input from one or more sensors and use this information to classify the driving skill level as in step 704. Although not shown, process 700 may also include a separate step of identifying the driver as discussed above with respect to process 400.

Next, in step 706, system 108 detects a triggering event in the form of a destination from the driver. That is, system 108, which may communicate with navigation system 104, detects that the driver is seeking a navigation route to a particular destination.

In step 708, navigation system 104 may determine multiple possible routes to the selected destination. As part of its normal operation, navigation system 104 may determine a travel time and/or travel distance for each of the possible routes. Additionally, system 108, in coordination with navigation system 104, may determine a driving difficulty (or a minimum driving skill level) for each of the possible routes, as in step 710.

Next, in step 712, system 108 (and/or a combination of system 108 and navigation system 104) determines if there is at least one route, among the multiple possible routes, that is appropriate for the driving skill level (determined in step 704) of the driver. If not, system 108 proceeds to step 714 to alert the driver and/or engage an autonomous driving system as discussed in further detail below.

If there is at least one route appropriate for the driving skill level, system 108 may proceed to step 716 to select an appropriate route according to both the driving difficulty and the driving skill level. In some cases, when multiple routes are appropriate for the driving skill level, the system may further consider factors such as driving time and/or driving distance in determining a final route for the driver.

In another step 718, system 108 could evaluate the performance of the driver as they are guided along the selected route. That is, the system could return to step 702 to receive additional informant from one or more sensors and then re-evaluate the driving skill level in step 704 as the driver travels on the selected route. Depending on how the driver performs on the route, the driving skill level could be upgraded or downgraded, which informs what routes may be selected for the driver in the future. Thus, the embodiments provide a feedback loop whereby a driver's skill level can be continuously re-assessed along selected routes, which further informs the selection of future routes to provide routes that are optimally safe and convenient for the driver.

As discussed above, there may be situations where none of the routes generated by a navigation system are suitable for a driver, given the driver's current driving skill level. If an autonomous driving system is available, a driving skill system could confirm that the autonomous driving system is able to drive along one or more routes and automatically activate the autonomous driving system.

Figure 8:
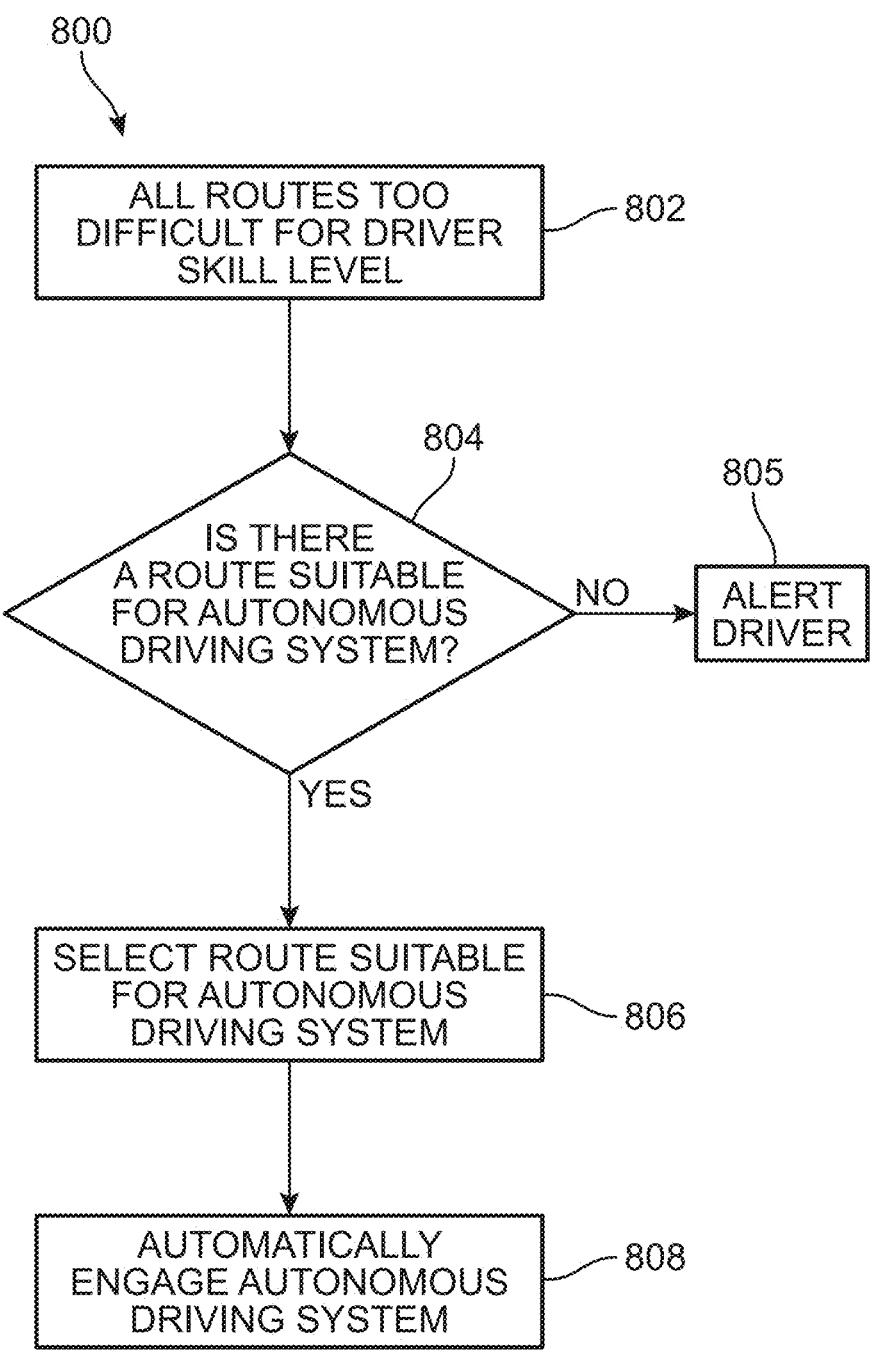
FIG. 8 is a schematic view of a process for automatically activating an autonomous driving system whenever there are no available routes that are appropriate for the driver's driving skill level.

FIG. 8 is a schematic view of a process 800 for automatically activating an autonomous driving system whenever there are no available routes that are appropriate for the driver's driving skill level.

Starting in step 802, system 108 has determined that all the routes generated by navigation system 104 are too difficult for the driving skill level of the current driver. In step 804, system 108 determines if any of the possible routes generated by navigation system 104 are suitable for an autonomous driving system (for example, autonomous driving system 212 of FIG. 2). To determine suitability, system 108 could look-up a known driving skill level, or associated metrics, for autonomous driving system 212 in memory. The driving skill level of autonomous driving system 212 could be provided by a manufacturer, or could be determined by evaluating the driving performance of autonomous driving system 212 using the same methods described above for evaluating the driving skill level of a human driver.

If the driving skill level of autonomous driving system 212 is sufficient for at least one of the multiple routes, system 108 proceeds to step 806. Otherwise, system 108 proceeds to step 805 to alert the driver that there are no safe routes that can be navigated by the driver or the autonomous system based on their respective driving skill levels.

In step 806, system 108 selects a suitable route for autonomous driving system 212. In step 808, system 108 automatically engages autonomous driving system 212 so that autonomous driving system 212 can move the motor vehicle along the selected route to the driver's selected destination.

The processes and methods of the embodiments described in this detailed description and shown in the figures may be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments may be stored as instructions and/or data on non-transitory computer-readable media. Examples of media that may be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network may comprise any combination of local area networks (LANs) and/or wide area networks (WANs), using both wired and wireless communication systems. A network may use various known communications technologies and/or protocols. Communication technologies may include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network may be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A motor vehicle, comprising: a plurality of sensors; an autonomous driving system; a navigation system; and a driving skill system, wherein the driving skill system is further configured to: receive information from the plurality of sensors while a user is driving the motor vehicle; provide the information from the plurality of sensors to a machine learning classifier to determine a driving skill level for the user; and modify the operation of the autonomous driving system using at least the driving skill level, wherein modifying the operation of the vehicle system comprises: determining that all of a multiple of routes generated by the navigation system from a current location to a destination selected by the user are too difficult for the user according to the driving skill level of the user; determining that a route from the current location to the destination is suitable for the autonomous driving system of the motor vehicle; and engaging the autonomous driving system to autonomously drive the motor vehicle along the route suitable for the autonomous driving system.

2. The motor vehicle according to claim 1, wherein the information from the plurality of sensors includes one or more of: gyroscope information, vehicle velocity information, vehicle acceleration information, steering sensor information, throttle sensor information, brake sensor information, gear state information, LIDAR information, RADAR information, or vehicle camera information.

3. The motor vehicle according to claim 1, wherein the determining that all of the multiple of routes are too difficult for the user further comprises determining a route difficulty for each of the multiple of routes, and wherein the route difficulty is determined based on one or more of: speed limits along the route, whether merging is required, traffic levels, or a need to navigate round-abouts or U-turns.

4. The motor vehicle according to claim 1, wherein the machine learning classifier is configured to output three or more different classifications.

5. The motor vehicle according to claim 1, wherein the machine learning classifier runs on a computing system integrated into the motor vehicle.

6. The motor vehicle according to claim 1, wherein the machine learning classifier is a neural network.

7. A method of controlling a motor vehicle, comprising: receiving information from a plurality of sensors while a user is driving the motor vehicle; providing the information from a plurality of sensors of the motor vehicle to a machine learning classifier to determine a driving skill level for the user; and modifying the operation of an autonomous driving system of the motor vehicle, using at least the driving skill level, by: determining that all of a multiple of routes generated by a navigation system from a current location to a destination selected by the user are too difficult for the user according to the driving skill level of the user; determining that a route from the current location to the destination is suitable for an autonomous driving system of the motor vehicle; and engaging the autonomous driving system to autonomously drive the motor vehicle along the route suitable for the autonomous driving system.

8. The method according to claim 7, wherein the machine learning classifier runs on a computing system integrated into the motor vehicle.

9. The method according to claim 7, wherein the machine learning classifier is a neural network.

10. The method according to claim 7, wherein the information from the plurality of sensors includes one or more of: gyroscope information, vehicle velocity information, vehicle acceleration information, steering sensor information, throttle sensor information, brake sensor information, gear state information, LIDAR information, RADAR information, or vehicle camera information.

11. The method according to claim 7, wherein the machine learning classifier is configured to output three or more different classifications.

12. The method according to claim 11, wherein the three or more classifications include a first classification corresponding to a beginner level of driving, a second classification corresponding to an intermediate level of driving, and a third classification corresponding to an advanced level of driving.

13. A system for controlling a motor vehicle, comprising: an autonomous driving system; and a driving skill system, wherein the driving skill system is further configured to: receive information from a plurality of sensors while a user is driving the motor vehicle; provide the information from the plurality of sensors to a machine learning classifier to determine a driving skill level for the user; and modify the operation of the autonomous driving system using at least the driving skill level, wherein modifying the operation of the vehicle system comprises: determining that all of a multiple of routes generated by a navigation system from a current location to a destination selected by the user are too difficult for the user according to the driving skill level of the user; determining that a route from the current location to the destination is suitable for the autonomous driving system of the motor vehicle; and engaging the autonomous driving system to autonomously drive the motor vehicle along the route suitable for the autonomous driving system.

14. The system according to claim 13, wherein determining that the route is suitable for the autonomous driving system comprises determining a driving skill level for the autonomous driving system and comparing the driving skill level for the autonomous driving system to a route difficulty for the route.

15. The system according to claim 13, wherein the driving skill level for the autonomous driving system is provided by a manufacturer.

16. The system according to claim 13, wherein the driving skill level for the autonomous driving system is determined by evaluating driving performance of the autonomous driving system.

17. The system according to claim 13, wherein the machine learning classifier is a neural network.

18. The system according to claim 17, wherein the neural network includes at least one of a recurrent neural network, a convolution neural network, or a transformer.

19. The system according to claim 13, wherein the machine learning classifier is configured to output three or more different classifications.

20. The system according to claim 13, wherein the information from the plurality of sensors includes one or more of: gyroscope information, vehicle velocity information, vehicle acceleration information, steering sensor information, throttle sensor information, brake sensor information, gear state information, LIDAR information, RADAR information, or vehicle camera information.

\* \* \* \* \*